United States Patent
Watanabe

(10) Patent No.: US 11,010,828 B2
(45) Date of Patent: May 18, 2021

(54) INFORMATION PROCESSING APPARATUS, INFORMATION PROCESSING METHOD, INFORMATION PROCESSING PROGRAM, RECORDING MEDIUM HAVING STORED THEREIN INFORMATION PROCESSING PROGRAM

(75) Inventor: Taichi Watanabe, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 880 days.

(21) Appl. No.: 14/127,444

(22) PCT Filed: Feb. 24, 2012

(86) PCT No.: PCT/JP2012/054559
§ 371 (c)(1),
(2), (4) Date: Dec. 18, 2013

(87) PCT Pub. No.: WO2012/176496
PCT Pub. Date: Dec. 27, 2012

(65) Prior Publication Data
US 2014/0114847 A1 Apr. 24, 2014

(30) Foreign Application Priority Data
Jun. 22, 2011 (JP) .............................. JP2011-138701

(51) Int. Cl.
*G06Q 40/00* (2012.01)
*G06Q 30/02* (2012.01)

(52) U.S. Cl.
CPC .............. *G06Q 40/00* (2013.01); *G06Q 30/02* (2013.01)

(58) Field of Classification Search
CPC ............................... G06Q 40/00; G06Q 30/02
(Continued)

(56) References Cited

U.S. PATENT DOCUMENTS

2005/0283473 A1 12/2005 Rousso et al.
2006/0047425 A1* 3/2006 Fukumi .............. G01C 21/3611
701/533

(Continued)

FOREIGN PATENT DOCUMENTS

CN 101151607 A 3/2008
JP 2001-167033 A 6/2001
(Continued)

OTHER PUBLICATIONS

Crafting Worlds Small and Great: [Third Edition] Goodison, Donna. Boston Globe; Boston, Mass. [Boston, Mass]Oct. 17, 2004: 13. (Year: 2004).*

(Continued)

*Primary Examiner* — Lalita M Hamilton
(74) *Attorney, Agent, or Firm* — Sughrue Mion, PLLC

(57) ABSTRACT

Provided are an information processing apparatus, an information processing method, an information processing program, and a recording medium having stored therein the information processing program, which can reduce time and effort necessary for a user to find his desired review information. The information processing apparatus searches transaction targets, based on a search condition used for searching transaction targets designated by a user, and acquires review information regarding each of the searched transaction targets. The information processing apparatus determines a display priority order of the review information regarding the transaction targets with respect to each of the searched transaction targets, based on the search condition, and displays at least one piece of the review information regarding each of the transaction targets on a display screen, based on the display priority order.

27 Claims, 6 Drawing Sheets

(58) Field of Classification Search
USPC .......................................................... 705/39
See application file for complete search history.

(56) References Cited

U.S. PATENT DOCUMENTS

| | | | |
|---|---|---|---|
| 2006/0129446 A1* | 6/2006 | Ruhl | G06Q 30/02 705/306 |
| 2006/0271416 A1* | 11/2006 | Morgan | G06Q 10/02 705/5 |
| 2006/0277290 A1* | 12/2006 | Shank | G06Q 10/00 709/223 |
| 2008/0071602 A1* | 3/2008 | Ojakaar | G06Q 30/02 705/14.44 |
| 2008/0097835 A1* | 4/2008 | Weiser | G06Q 30/02 705/306 |
| 2008/0114748 A1* | 5/2008 | Varner | G06Q 30/02 |
| 2008/0201227 A1* | 8/2008 | Bakewell | G06Q 30/02 705/14.19 |
| 2010/0066488 A1* | 3/2010 | Hollander | G06Q 30/02 340/5.8 |
| 2011/0029541 A1 | 2/2011 | Schulman | |
| 2011/0113027 A1 | 5/2011 | Shen et al. | |
| 2011/0208669 A1 | 8/2011 | Ruhl et al. | |
| 2012/0158735 A1 | 5/2012 | Ruhl et al. | |
| 2013/0144862 A1 | 6/2013 | Ruhl et al. | |

FOREIGN PATENT DOCUMENTS

| | | |
|---|---|---|
| JP | 2004-295396 A | 10/2004 |
| JP | 2006-99727 A | 4/2006 |
| JP | 2006-172029 A | 6/2006 |
| JP | 2006-235877 A | 9/2006 |
| JP | 2007-336008 A | 12/2007 |
| JP | 2008-139948 A | 6/2008 |
| JP | 2009-129119 A | 6/2009 |
| WO | 2005/120059 A1 | 12/2005 |
| WO | 2009039392 A | 3/2009 |

OTHER PUBLICATIONS

International Search Report for PCT/JP2012/054559 dated Apr. 17, 2012.

* cited by examiner

FIG.3A

| USER INFORMATION DB 21 |
|---|
| USER ID |
| LOGIN ID |
| PASSWORD |
| NICKNAME |
| NAME |
| GENDER |
| AGE ADDRESS |
| ……… |

FIG.3B

| FACILITY INFORMATION DB 22 |
|---|
| FACILITY ID |
| LOGIN ID |
| PASSWORD |
| FACILITY NAME |
| FACILITY IMAGE |
| FACILITY FEATURE |
| USAGE FEE |
| ADDRESS |
| ……… |

FIG.3C

| PLAN INFORMATION DB 23 | | | |
|---|---|---|---|
| FACILITY ID | PLAN ID | | |
| | PLAN INFORMATION | PLAN NAME | |
| | | FEATURE | |
| | | USAGE PURPOSE | |
| | | USAGE SCHEDULE | |
| | | USAGE FEE | |
| | | NUMBER OF USERS | |
| | | ……… | |
| | TRANSACTION INFORMATION | USER ID OF SUBSCRIBER | |
| | | USAGE SCHEDULE | |
| | | USAGE PERIOD | |
| | | NUMBER ATTRIBUTE | |
| | | USE OR NON-USE | |
| | | ……… | |
| | CONTRIBUTION INFORMATION | REVIEW INFORMATION | |
| | | EVALUATION INFORMATION | COMPREHENSIVE EVALUATION |
| | | | EVALUATION VALUE OF SERVICE |
| | | | EVALUATION VALUE OF LOCATION |
| | | | EVALUATION VALUE OF ROOM |
| | | | EVALUATION VALUE OF FACILITY |
| | | | EVALUATION VALUE OF BATH |
| | | | EVALUATION VALUE OF MEAL |
| | | USER ID OF CONTRIBUTOR | |
| | | NICKNAME OF CONTRIBUTOR | |
| | | CONTRIBUTION DATE AND TIME | |
| | | ……… | |
| | COMMENT INFORMATION | | |
| ……… | | | |

FIG.5A
DISPLAY EXAMPLE OF SEARCH CONDITION INPUT PAGE

FIG.5B
DISPLAY EXAMPLE OF FACILITY LIST PAGE

FIG.6A
DISPLAY EXAMPLE OF REVIEW LIST PAGE

CUSTOMER VOICE (REVIEW) OF ACCOMMODATION XXX

DISPLAY 1-100 CASES AMONG 350 CASES  1 | 2 | 3 | 4 | 5 | 6 | 7 | 8 | 9 | 10 | 11 | NEXT 100 ITEMS

CONTRIBUTOR ○○  2010-5-22  20:20:25
Three family members stayed. We were thoroughly satisfied with the bath and the meal.
The bath water flowed to the open-air bath・・・・・・・・・・・・・・・
EVALUATION・・・TOTAL★★★★
PURPOSE・・・LEISURE
COMPANION・・・FAMILY CONTRIBUTOR △○  2010-6-22  10:20:25
The bath was rented・・・・・・・・・・・・・・・・・・・・
EVALUATION・・・TOTAL★★★★
PURPOSE・・・LEISURE
COMPANION・・・FAMILY CONTRIBUTOR □○  2010-3-20  10:20:25
EVALUATION・・・TOTAL★★★★
PURPOSE・・・LEISURE
COMPANION・・・FAMILY CONTRIBUTOR □△  2011-1-20  12:20:25
EVALUATION・・・TOTAL★★★★☆
PURPOSE・・・HOT SPRING
COMPANION・・・FAMILY

FIG.6B
DISPLAY EXAMPLE OF FACILITY LIST PAGE

SORT BY: ORDER OF RECOMMENDATION  ASCENDING ORDER OF PRICE  DESCENDING ORDER OF COMPREHENSIVE EVALUATION  61

DISPLAY 1-100 CASES AMONG 350 CASES  1 | 2 | 3  NEXT 100 ITEMS

KEYWORD
[     ▽]
[           ]
(SEARCH)

NARROW A RANGE TO REGION

WHOLE COUNTRY
  HOKKAIDO
  TOHOKU
  KITAKANTO
  METROPOLITAN AREA
  IZU/HAKONE
  KOSHINECHU
  HOKURIKU
  TOKAI
  KINKI
  CHUGOKU
  SHIKOKU
  KYUSHU

ACCOMMODATION XXX                                      [MINIMUM CHARGE] 1,000 YEN ~
TOTAL★★★★☆  CUSTOMER VOICE (1110 CASES)
YAMANASHI/KATSUNUMA, YAMANASHI-KEN
ABUNDANT NATURAL AND QUIET・・・・・・・・・
                                                                          65
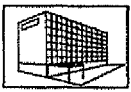
(EMPTY ROOM SEARCH)  (ACCOMMODATION PLAN LIST)

CONTRIBUTOR ○○  2010-5-22  20:20:25
Three family members stayed. We were thoroughly satisfied with the bath and the meal.
The bath water flowed to the open-air bath・・・・・・・・・・・・・・

66 —— DISPLAY MORE REVIEW INFORMATION

HOT SPRING AB INN                                       [MINIMUM CHARGE] 3,000 YEN ~
TOTAL★★★★☆  CUSTOMER VOICE (3110 CASES)
MAEBASHI, GUNMA-KEN

(EMPTY ROOM SEARCH)  (ACCOMMODATION PLAN LIST)

INFORMATION PROCESSING APPARATUS, INFORMATION PROCESSING METHOD, INFORMATION PROCESSING PROGRAM, RECORDING MEDIUM HAVING STORED THEREIN INFORMATION PROCESSING PROGRAM

CROSS REFERENCE TO RELATED APPLICATIONS

This application is a National Stage of International Application No. PCT/JP2012/054559 filed Feb. 24, 2012, claiming priority based on Japanese Patent Application No. 2011-138701 filed Jun. 22, 2011, the contents of all of which are incorporated herein by reference in their entirety.

TECHNICAL FIELD

The present invention relates to the technical field of information processing apparatuses and the like which can display a plurality of review information regarding transaction targets, which is contributed by purchasers or users, in a predetermined display order.

BACKGROUND ART

In the past, there have been known shopping sites that allow a user of a terminal device to purchase desired products via Internet, or facility reservation sites that allow a user of a terminal device to reserve the use of desired accommodation. A user of a terminal device accessing such sites can browse review information regarding products or accommodations, which is contributed by purchasers or users. Such review information is displayed on a terminal device in a list form in predetermined display order. For example, Patent Literature 1 (FIG. 9) illustrates a list page that displays review information regarding a particular product in descending order of date. Also, the display order of the review information may be sorted by other keys such as descending order of product evaluation.

CITATION LIST

Patent Literature

Patent Literature 1: JP 2009-129119 A

SUMMARY OF THE INVENTION

Problem to be Solved by the Invention

However, in the related art, for example, when a plurality of review information is contributed with respect to products or accommodations, there is a problem that it takes a user much time and effort to find desired review information.

The present invention has been made in view of the above problem and is directed to provide an information processing apparatus, an information processing method, an information processing program, and a recording medium having stored therein the information processing program, which can reduce time and effort necessary for a user to find desired review information.

Means for Solving the Problem

In order to solve the above problem, the invention according to claim 1 is an information processing apparatus comprising:

a searching means that searches transaction targets, based on a search condition used for searching transaction targets designated by a user;

an acquiring means that acquires review information regarding each of the transaction targets searched by the searching means, from a storing means that stores a plurality of review information regarding the transaction targets in association with each of the transaction targets;

a determining means that determines a display priority order of the review information regarding the transaction targets with respect to each of the transaction targets searched by the searching means, based on the search condition; and a controlling means that displays at least one piece of the review information regarding each of the transaction targets searched by the searching means on a display screen, based on the display priority order determined by the determining means.

According to the present invention, it is configured such that the display priority order of the review information regarding the transaction targets is determined based on the search condition used for searching the transaction targets, and at least one piece of the review information regarding each of the transaction targets is displayed based on the display priority order. Therefore, even when a plurality of review information regarding the transaction targets is contributed, it is possible to reduce time and effort necessary for the user to find desired review information, and the user is allowed to preferentially browse review information estimated to be desired by the user.

The invention according to claim 2 is the information processing apparatus according to claim 1, wherein the determining means determines the display priority order, based on the number of search words that are input as the search condition and that are included in the review information.

According to the present invention, the user is allowed to preferentially browse the review information having a large number of appearances of the search word input by the user.

The invention according to claim 3 is the information processing apparatus according to claim 2, wherein the determining means determines the display priority order, based on the number of the search words included in the review information, and the number of terms of at least either of related words and synonyms associated with the search words.

According to the present invention, the user is allowed to preferentially browse the review information having a large number of appearances of the search word input by the user and a large number of appearances of the related word and the synonym associated with the search word.

The invention according to claim 4 is the information processing apparatus according to any one of claims 1 to 3, wherein evaluation scores regarding evaluation items with respect to the transaction targets are associated with the review information, and the determining means determines the display priority order, based on the evaluation scores regarding the evaluation items associated with the search words input as the search condition.

According to the present invention, the user is allowed to preferentially browse the review information having a high evaluation score with respect to the evaluation item associated with the search word input by the user.

The invention according to claim 5 is the information processing apparatus according to any one of claims 1 to 4, wherein the determining means determines the display priority order such that a higher display priority is given to the review information including the plurality of search words input as the search condition.

According to the present invention, the user is allowed to preferentially browse the review information having a high inclusion rate of the plurality of search words input by the user.

The invention according to claim 6 is the information processing apparatus according to any one of claims 1 to 5, wherein the determining means determines the display priority order, based on input order of the plurality of search words input as the search condition.

According to the present invention, the user is allowed to preferentially browse the review information having an earlier input order with respect to the plurality of search words input by the user.

The invention according to claim 7 is the information processing apparatus according to any one of claims 1 to 6, wherein the determining method determines the display priority order such that a higher display priority is given to the review information including the search word associated with an appeal component preset by a provider side of the target among the plurality of search words input as the search condition.

According to the present invention, the user is allowed to preferentially browse the review information including the search word associated with the appeal component of the provider side of the transaction target among the plurality of search words input by the user.

The invention according to claim 8 is the information processing apparatus according to any one of claims 1 to 7, wherein, among number attributes classified into a plurality of attributes according to the number of users, the number attribute to which the number of users using the transaction target in the past belongs is associated with the review information, and the determining means determines the display priority order such that a higher display priority is given to the review information associated with the number attribute to which the number of users input as the search condition belongs.

According to the present invention, the user is allowed to preferentially browse the review information matched with the number of users input by the user.

The invention according to claim 9 is the information processing apparatus according to claim 8, wherein the number of users using the transaction target in the past is associated with the review information, and when there is a plurality of review information associated with the same number attribute, the display priority order is determined such that a higher display priority is given to the review information associated with the number of users which has a small difference from the number of users input as the search condition.

According to the present invention, the user is allowed to preferentially browse the review information matched with the number of users input by the user.

The invention according to claim 10 is the information processing apparatus according to any one of claims 1 to 9, wherein the storing means stores comment information of a provider side of the transaction target corresponding to the review information in association with the review information, and the determining means determines the display priority order such that higher display priority is given to the review information associated with the comment information including a preset positive term with respect to the search word input as the search condition.

According to the present invention, the user is allowed to preferentially browse the review information associated with comment information including the positive term with respect to the search word input by the user.

The invention according to claim 11 is the information processing apparatus according to any one of claims 1 to 10, wherein the determining means determines the display priority order such that a higher display priority is given to the review information including a preset positive term with respect to the search word input as the search condition.

According to the present invention, the user is allowed to preferentially browse the review information including the positive term with respect to the search word input by the user.

The invention according to claim 12 is the information processing apparatus according to any one of claims 1 to 11, wherein a past usage period of the transaction target is associated with the review information, and the determining means determines the display priority order such that a higher display priority is given to the review information associated with the same usage period as a period associated with the search condition.

According to the present invention, the user is allowed to preferentially browse the review information matched with the period including the usage schedule input by the user.

The invention according to claim 13 is the information processing apparatus according to any one of claims 1 to 12, wherein the determining means determines the display priority order of the review information including the preset positive term with respect to the search word input as the search condition, and the display priority order of the review information including the preset negative term with respect to the search word input as the search condition, respectively, and the controlling means displays the review information including the positive term and the review information including the negative term at different positions, based on the display priority orders determined by the determining means.

According to the present invention, since the user can browse review information while comparing the review information including the positive term with the list of the review information including the negative term with respect to the input search word, it is possible to reduce time and effort necessary for the user to find desired review information.

The invention according to claim 14 is the information processing apparatus according to any one of claims 1 to 13, wherein the controlling means highlights a search word in the review information including the search word input as the search condition.

According to the present invention, since the user can browse the review information while looking at the highlighted input search word, it is possible to further reduce time and effort necessary for the user to find desired review information.

The invention according to claim 15 is an information processing method, which is executed by a computer, the information processing method comprising:

a step of searching transaction targets, based on a search condition used for searching transaction targets designated by a user;

a step of acquiring review information regarding each of the searched transaction targets, from a storing means that stores a plurality of review information regarding the transaction targets in association with each of the transaction targets;

a step of determining a display priority order of the review information regarding the transaction targets with respect to each of the searched transaction targets, based on the search condition; and a step of displaying at least one piece of the review information regarding each of the searched transaction targets on a display screen, based on the determined display priority order.

The invention according to claim 16 is an information processing program which causes a computer to function as:

a searching means that searches transaction targets, based on a search condition used for searching transaction targets designated by a user;

an acquiring means that acquires review information regarding each of the transaction targets searched by the searching means, from a storing means that stores a plurality of review information regarding the transaction targets in association with each of the transaction targets;

a determining means that determines a display priority order of the review information regarding the transaction targets with respect to each of the transaction targets searched by the searching means, based on the search condition; and a controlling means that displays at least one piece of the review information regarding each of the transaction targets searched by the searching means on a display screen, based on the display priority order determined by the determining means.

The invention according to claim 17 is a recording medium having stored therein an information processing program which causes a computer to function as:

a searching means that searches transaction targets, based on a search condition used for searching transaction targets designated by a user;

an acquiring means that acquires review information regarding each of the transaction targets searched by the searching means, from a storing means that stores a plurality of review information regarding the transaction targets in association with each of the transaction targets;

a determining means that determines a display priority order of the review information regarding the transaction targets with respect to each of the transaction targets searched by the searching means, based on the search condition; and a controlling means that displays at least one piece of the review information regarding each of the transaction targets searched by the searching means on a display screen, based on the display priority order determined by the determining means.

Advantageous Effect of the Invention

According to the present invention, it is configured such that the display priority order of the review information regarding the transaction targets is determined based on the search condition used for searching the transaction targets, and at least one piece of the review information regarding each of the transaction targets is displayed based on the display priority order. Therefore, even when a plurality of review information regarding the transaction targets is contributed, it is possible to reduce time and effort necessary for the user to find desired review information, and the user is allowed to preferentially browse review information estimated to be desired by the user.

BRIEF DESCRIPTION OF THE DRAWINGS

FIG. 3A to FIG. 3C are diagrams illustrating examples of contents (items) registered in a variety of databases.

FIG. 5A is a diagram illustrating a display example of a search condition input page, and FIG. 5B is a diagram illustrating a display example of a facility list page.

FIG. 6A is a diagram illustrating a display example of a review list page, and FIG. 6B is a diagram illustrating a display example of a facility list page on which review information is displayed.

MODE FOR CARRYING OUT THE INVENTION

Hereinafter, embodiments of the present invention will be described with reference to the drawings. Also, embodiments described below are embodiments in a case where the present invention is applied to an information providing system.

[1. Schematic Configuration and Function of Information Providing System]

First, a schematic configuration and function of an information providing system S according to an embodiment of the present invention will be described with reference to FIG. 1.

Figure 1:
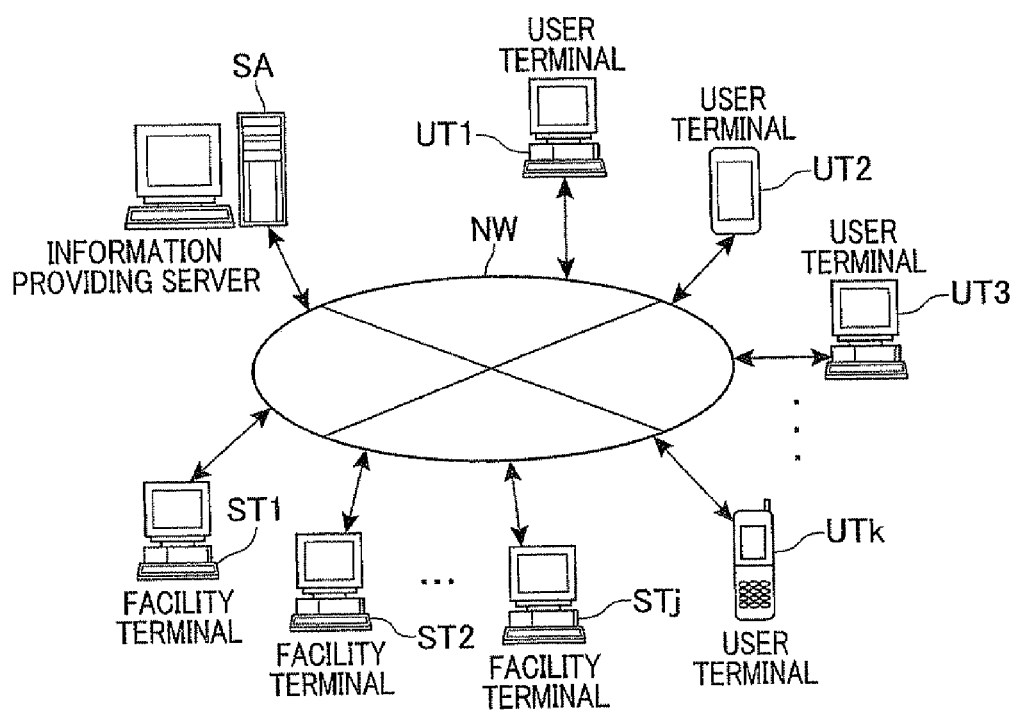
FIG. 1 is a diagram illustrating an example of a schematic configuration of an information providing system S according to the present embodiment.

FIG. 1 is a diagram illustrating an example of a schematic configuration of an information providing system S according to the present embodiment. As illustrated in FIG. 1, the information providing system S includes a plurality of user terminals (example of a terminal device) UTn (n=1, 2, 3 . . . k), a plurality of facility terminals STm (m=1, 2, 3 . . . j), and an information providing server (example of an information processor) SA. Each of the user terminals UTn, the facility terminals STm, and the information providing server SA are connected to a network NW. The network NW is constructed by, for example, Internet, a dedicated communication line (for example, community antenna television (CATV) line, a mobile communication network (including a base station and the like), and a gateway or the like.

Also, the user terminal UTn and the facility terminals STm are configured by, for example, a personal computer (PC), a personal digital assistant (PDA), a mobile phone, or a smartphone, and have a browser function. The user terminals UTn and the facility terminals STm obtain a web page by performing a page request (hypertext transfer protocol (HTTP) request) to the information providing server SA by a web browser, and display the web page on a window screen displayed on a display. Also, the window screen is an active display area of the web browser.

The information providing server SA is a server (for example, a web server, a database server, or the like) that is installed for operating, for example, a facility reservation site and the like. The facility reservation site is a site that allows the user of the user terminal UTn to reserve the use of a desired facility (example of a transaction target according to facility reservation). Examples of the facility may include accommodations, golf course facilities, public facilities, and commercial facilities.

Figure 2:
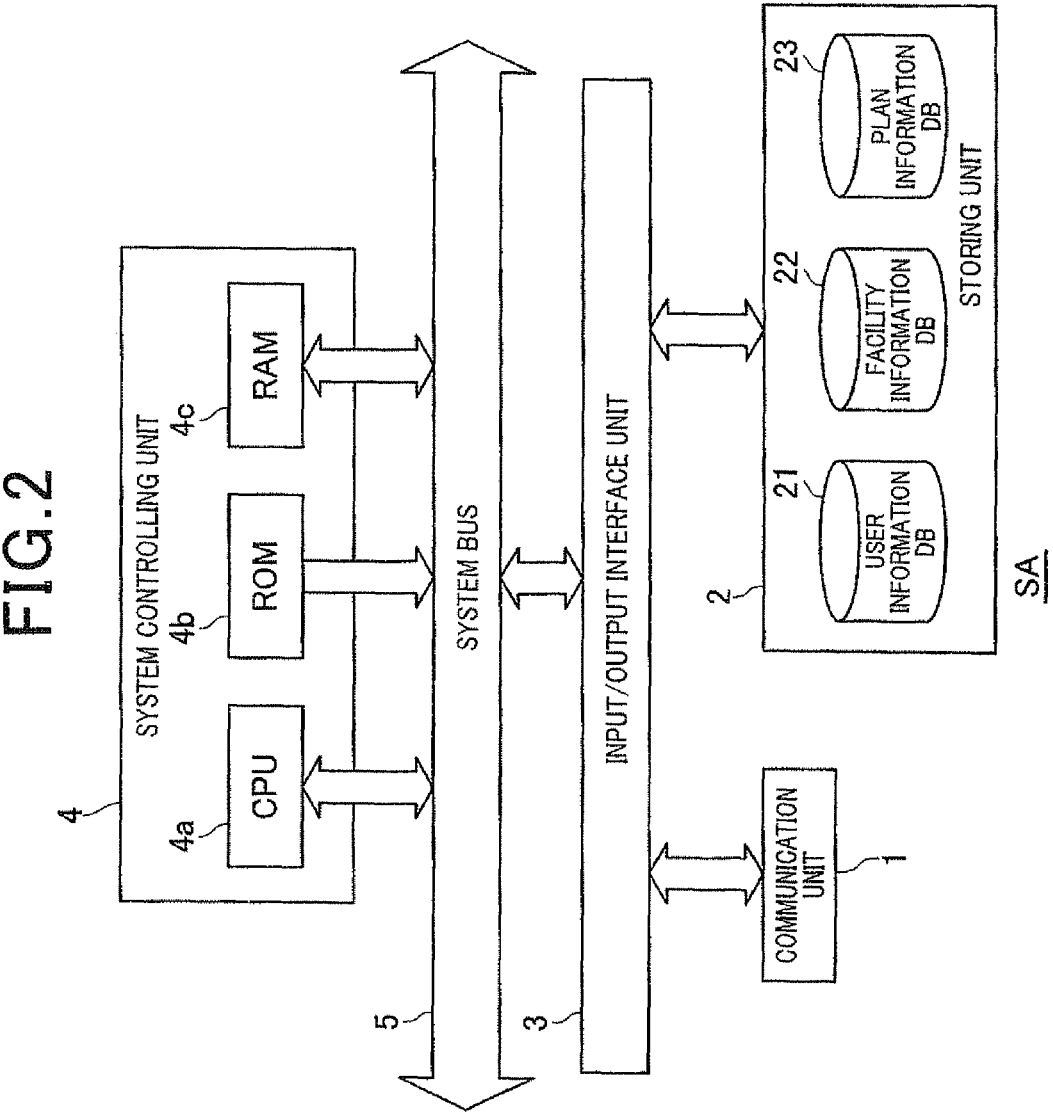
FIG. 2 is a block diagram illustrating an example of a schematic configuration of an information providing server SA according to the present embodiment.

FIG. 2 is a block diagram illustrating an example of a schematic configuration of an information providing server SA according to the present embodiment. As illustrated in FIG. 2, the information providing server SA includes a communication unit 1, a storing unit 2 (example of a storing means), an input/output interface unit 3, and a system controlling unit 4. The system controlling unit 4 and the input/output interface unit 3 are connected through a system bus 5.

The communication unit 1 is configured to access the network NW and control a communication state of the user terminal UTn or the facility terminal STm.

The storing unit 2 is configured by, for example, a hard disk drive or the like, and stores various programs, such as an operating system and a server program (including an information processing program of the present invention). Also, the server program, for example, may be distributed from a predetermined server or the like through the network NW, or may be provided in a state of being recorded in a compact disc (CD), a digital versatile disc (DVD), or the like.

Also, the storing unit 2 stores a structured document (for example, hyper text markup language (HTML) document or XHTML document and the like) file constituting a web page displayed on the user terminal UTn, an image file, and the like. As such a web page, there are a page (hereinafter, referred to as a "search condition input page") on which a user can input search condition used to search for a facility selected by the user, a page (hereinafter, referred to as a "facility list page") that displays a list of facility information regarding facilities (hereinafter, referred to as "facility information of facility"), a page (hereinafter, referred to as a "facility detail page") that displays detail information of the facility, a page (hereinafter, referred to as "plan list page") that displays a list of plan information regarding a plan provided by the facility (hereinafter, referred to as "plan information of facility"), a page (hereinafter, referred to as a "review input page") on which a user (for example, a user having reserved the facility or his/her accompanying person) can input a review and evaluation of the facility as a contributor, and a page (hereinafter, referred to as a "comment input page") on which a facility provider side can input a comment on the review or evaluation.

Herein, the facility information of the facility includes information of, for example, a facility name, a facility image, a facility feature, a usage fee, an address, a telephone number, a traffic access, and the like. Also, the facility is one of the transaction targets related to the facility reservation. Also, in a case where the facility is the accommodation, the detail information of the facility includes information of check-in, check-out, in-building facility, number of rooms, room facility (including equipment), and service, as well as the facility information. Also, in a case where the facility is the accommodation, the plan information of the plan provided from the corresponding facility includes, information of, for example, a plan name, a feature, a usage purpose, a usage schedule, a usage fee, number of users, a meal, and payment and the like. Also, the plan also is one of the transaction targets related to the facility reservation.

Also, the review (also called word of mouth) refers to, for example, impression, comment, and criticism, and the review information refers to, for example, a character string indicating the review (Japanese, English, Chinese, and the like are possible, and there is no special limitation to the language). Also, the evaluation information is an evaluation value (example of an evaluation score) representing the review with numbers of "1 to 5", and the evaluation is highly ranked as the number is higher. Also, the user may perform the evaluation of the facility with respect to each of a plurality of evaluation items (also called evaluation axes) of different viewpoints. Examples of the evaluation items of the accommodation may include a service (customer service), a location, a room, equipment (amenities), a bath, and a meal. Also, for example, an average value of the evaluation values of the respective evaluation items is a comprehensive evaluation (comprehensive evaluation value) of the facility. Also, the evaluation is a concept included in the review in a broad sense, but, in the present embodiment, unless otherwise expressly mentioned, the review and the evaluation are distinguished from each other. Also, the comment of the facility side includes appreciation for contributors, apology, improvements, and the like.

Also, a user information database (DB) 21, a facility information database (DB) 22, a plan information database (DB) 23 are constructed in the storing unit 2.

FIG. 3A to FIG. 3C are diagrams illustrating examples of contents (items) registered in a variety of databases.

As illustrated in FIG. 3A, user ID, login ID, password, nickname, name, gender, age, address, telephone number, and email address of a user who is registered as a user member, are registered (stored) in the user information database 21 in association with each of users. The user ID is identification information unique to each of the users. The login ID and the password are authentication information used for login processing (user's authentication processing). All or part of the user ID, the login ID, the password, the nickname, the name, the gender, the age, the address, the phone number, and of the email address, for example, are transmitted from the user terminal UTn when the user is registered as the member and are then registered.

Next, as illustrated in FIG. 3B, facility ID, login ID, password, facility name, facility image, facility feature, usage fee, address, telephone number, traffic access, and email address of a facility which is registered as a facility member, and other detail information of the facility or the like are registered (stored) in the facility information database 22 in association with each of facilities. The facility ID is identification information unique to each of the facilities. The login ID and the password are authentication information used for login processing (facility's authentication processing). Also, all or part of the facility ID, the login ID, the password, the facility name, the facility image, the facility feature, the usage fee, the address, the telephone number, the traffic access, the email address, and other detail information of the facility, for example, are transmitted from the facility terminal STm at the time of member registration of the facility and are then registered.

Next, as illustrated in FIG. 3C, plan ID of the plan provided from the facility, plan information of the facility, transaction information, contribution information, and comment information are registered (stored) in the plan information database 23 in association with each of plans. The plan ID is identification information unique to each of the users. Also, the plan ID and the plan information, for example, are transmitted from the facility terminal STm at the time of plan preparation of the facility and are registered. For example, in a case where the facility is the accommodation, as an example of the plan provided from the corresponding facility, there is a plan "18:00 check-in plan single". Also, in the plan information database 23, the facility ID of the facility providing the corresponding plan is registered in the plan ID of the plan in association with each other. Also, user ID of the user performing the reservation, usage schedule (for example, in the case of the accommodation, scheduled lodging date or duration), facility usage period, number of facility users (for example, five persons), number attribute, and information regarding whether the facility is used (whether the reservation is performed) or the like are included in the transaction information. The facility usage period is represented by, for example, seasons (spring, summer, fall, and winter). The number attribute is an attribute classified into a plurality of attributes according to the number of users. Examples of the number attribute may include "1-person use", "2-person use", and "N-person use" (where N is 3 or more). When the number of users is 1, the number of users belongs to "1-person use" of the number attribute. When the number of users is 2, the number of users belongs to "2-person use" of the number attribute. When the number of users is three or more, the number of users belongs to "N-person use" of the number attribute. The transaction information, for example, is registered in a case where a reservation confirmation operation is performed by a user who logs in, in a state where a facility detail page or the like is displayed on a user terminal UTn. Also, the contribution information includes user's review information regarding the facility, evaluation information, and information of user ID of a user who contributes the information (hereinafter, referred to as a "contributor"), nickname of the contributor, and contribution date and time or the like. The evaluation information includes comprehensive evaluation, and user's evaluation value regarding each of a plurality of evaluation items (user's evaluation value regarding the facility). In the example illustrated in FIG. 3C, as the evaluation items, six items are proposed: a service (customer service), a location, a room, equipment (amenities), a bath, and a meal, and an average value of evaluation values of the six items are the comprehensive evaluation. The contribution information is registered in a case where a contribution operation is performed by a user who logs in, in a state where a review input page is displayed on a user terminal UTn. Therefore, the contribution information (review information) is associated with the facility (facility ID). Also, the facility, of which the facility information is registered in the facility information database 22, includes facilities that are not yet associated with the contribution information (having no contribution of review information) as well as the facility that is associated with one or a plurality of contribution information. Also, the comment information, for example, is registered in a case where a comment registration operation is performed by a facility manager who logs in, in a state where a comment input page is displayed on a facility terminal STm.

Also, in the above example, the facility information database 22 and the plan information database 23 are separated from each other, but the facility information database 22 and the plan information database 23 may be integrated with each other. Also, the various databases may be provided in a storing means of a predetermined server to which the information providing server SA can be accessible.

The input/output interface unit 3 is configured to perform interface processing among the communication unit 1, the storing unit 2, and the system controlling unit 4.

The system controlling unit 4 is configured by a central processing unit (CPU) 4a, a read only memory (ROM) 4b, a random access memory (RAM) 4c, and the like. The system controlling unit 4 as the computer performs web page providing processing or the like by executing a server program stored in the storing unit 2. In the web page providing processing, the system controlling unit 4 functions as a searching means, an acquiring means, a determining means, and a controlling means of the present invention according to the information processing program of the present invention (that is, the information processing program of the present invention causes the system controlling unit 4 to execute the above means). More specifically, the system controlling unit 4 searches for facilities based on a search condition used for facility search (for example, narrowing search), and acquires review information regarding each of the searched facilities from, for example, the plan information database 23. Then, the system controlling unit 4 determines display priority order of the review information regarding the facilities with respect to each of the searched facilities, based on the search condition used for the corresponding search. That is, the search condition used for the facility search is useful for determining the display priority order of the review information regarding the corresponding facilities. Then, the system controlling unit 4 displays at least one piece of the review information regarding the searched facilities on the window screen of the user terminal UTn, based on the determined display priority order.

[2. Operation of Information Providing System S]

Next, the web page providing processing in the system controlling unit 4 of the information providing server SA will be described with reference to FIG. 4 and the like. FIG. 4A and FIG. 4B are flowcharts illustrating web page providing processing in the system controlling unit 4 of the information providing server SA. Also, in the following description, it is assumed that the user terminal UT1 displays a search condition input page, which is acquired from the information providing server SA, on a window screen. Also, it is assumed that the user of the user terminal UT1 is logged in by login processing of the information providing server SA.

Figures 5A, 5B:
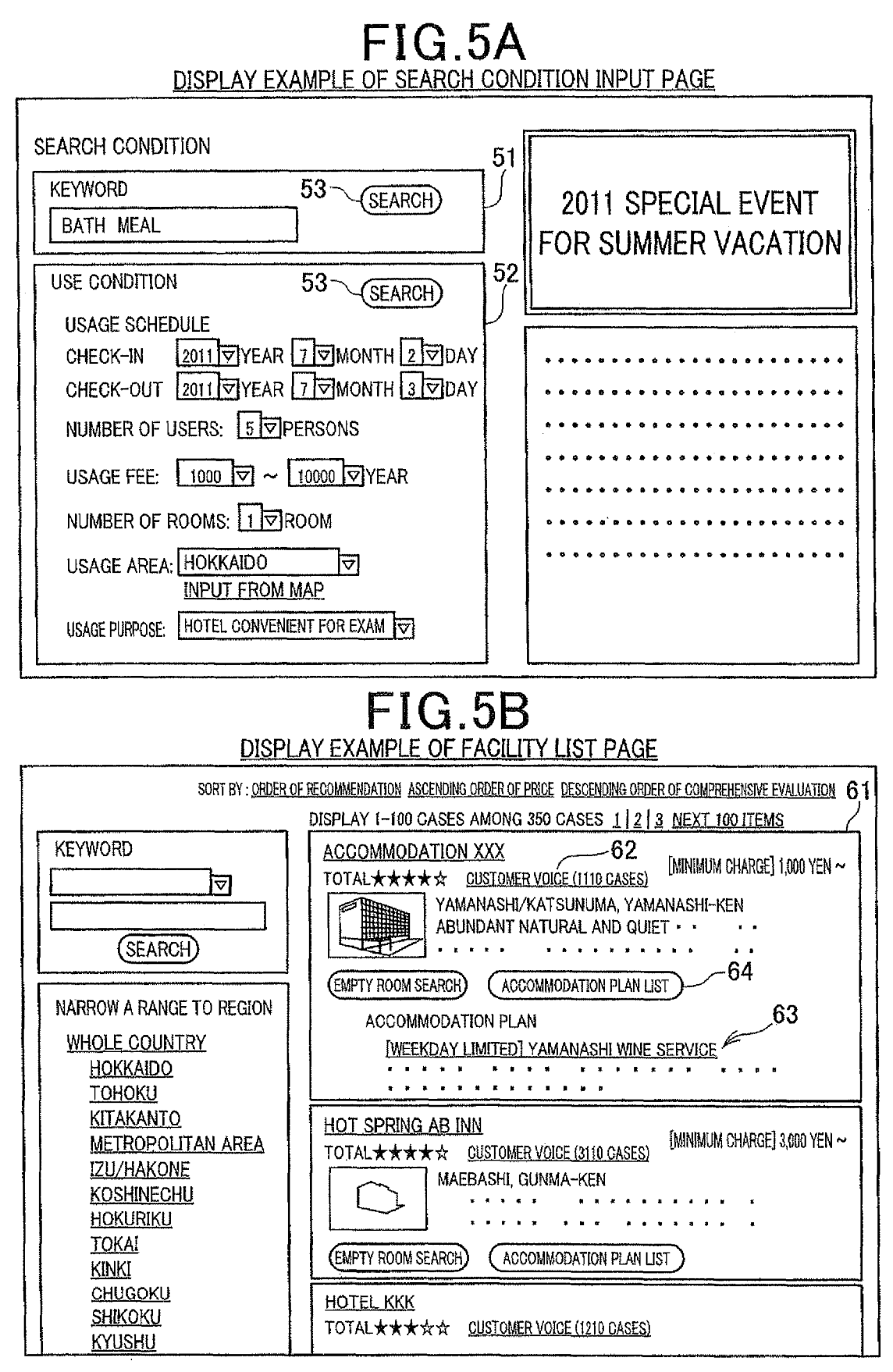

FIG. 5A is a diagram illustrating a display example of the search condition input page. A keyword input unit 51 and a use condition input unit 52 capable of inputting a search condition used for search are provided in the search condition input page illustrated in FIG. 5A. Also, the search condition is used for searching the plan the facility provides. In the keyword input unit 51, the user of the user terminal UT1 can input a keyword (search word), such as facility name or feature, as the search condition through an operation unit (a selection input from input candidates is also included). Also, in the use condition input unit 52, the user of the user terminal UT1 can input a use condition as the search condition through the operation unit. Herein, the use condition includes a usage schedule, a usage fee, number of users, a usage area, a usage purpose, and the like.

When the user of the user terminal UT1 performs a search request operation (for example, designates a search button 53) after inputting at least one of the keyword and the use condition as the search condition, a page request including a search query (condition information) representing the input search condition is transmitted from the user terminal UT1 through the network NW to the information providing server SA. The page request represents, for example, a request for a facility list page or a plan list page.

Figure 4A:
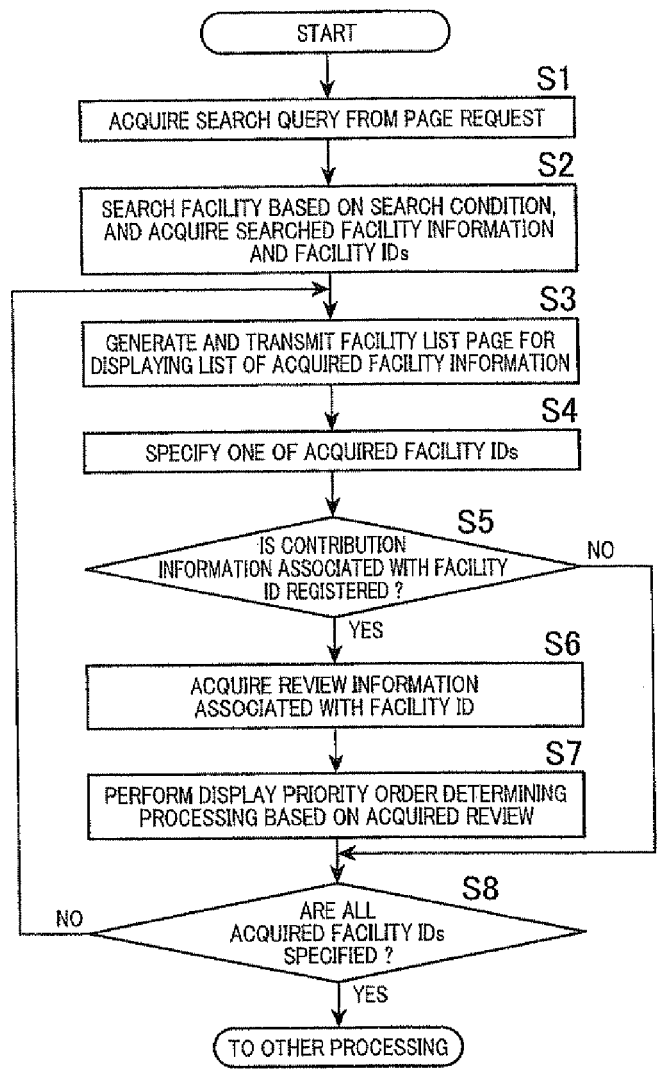
FIG. 4A and FIG. 4B are flowcharts illustrating a web page providing processing in a system controlling unit 4 of the information providing server SA.
Figure 4B:
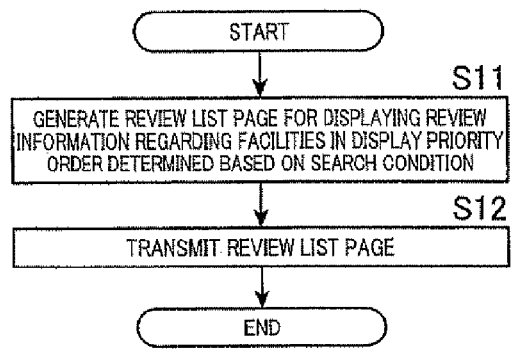

When receiving the page request from the user terminal UT1, the information providing server SA starts processing illustrated in FIG. 4A. In step S1 illustrated in FIG. 4A, the system controlling unit 4 of the information providing server SA acquires a search query from the received page request (step S1). Subsequently, with reference to the facility information database 22 and the plan information database 23, the system controlling unit 4 searches for a facility satisfying the corresponding search condition, based on the search condition provided by the search query acquired in the step S1, and acquires facility information and facility IDs of the searched facility (step S2). Also, the system controlling unit 4 may be configured to acquire the plan information associated with the acquired facility IDs from the plan information database 23.

Subsequently, the system controlling unit 4 generates a facility list page displaying a list of facility information acquired in the step S1, and transmits a structured document file or the like of the corresponding facility list page to the user terminal UT1 (step S3). In this manner, the list of facility information is displayed by a web browser of the user terminal UT1 on the window screen in preset display order (for example, descending order of the comprehensive evaluation value). FIG. 5B is a diagram illustrating a display example of the facility list page. A list of facility information of facilities satisfying the search condition input by the user is displayed on the facility list page illustrated in FIG. 5B. In FIG. 5B, for example, a button for displaying a review list page (herein, a character string "customer voice") 62 (for example, a link to a review list page is embedded) is displayed in a display area 61 of facility information of a facility XXX. Also, a part 63 of the plan information and a button 64 for displaying the plan list page (for example, a link to the plan list page is embedded) is displayed in the display area 61 of the facility information of the accommodation XXX. On the facility list page displayed as above, facility information that cannot be displayed within the window screen is displayed on the window screen by scrolling display content of the facility list page according to a user's scroll operation.

Subsequently, the system controlling unit 4 specifies one of the facility IDs acquired in the step S1 (step S4). Also, the specifying of the facility ID, for example, is performed in registration order.

Subsequently, the system controlling unit 4 determines whether the contribution information associated with the facility ID specified in the step S4 through the plan ID is registered in the plan information database 23 (step S5). When it is determined that the contribution information associated with the facility ID is registered in the plan information database 23 (YES in the step S5), the system controlling unit 4 proceeds to step S6. On the other hand, when it is determined that the contribution information associated with the facility ID is not registered in the plan information database 23 (that is, when the number of contribution of review information regarding the corresponding facility is zero) (NO in the step S5), the system controlling unit 4 proceeds to step S8.

In step S6, the system controlling unit 4 acquires the contribution information (review information) associated with the facility ID in the plan information database 23. Subsequently, the system controlling unit 4 performs display priority order determining processing based on the acquired contribution information (step S7). The display priority order determining processing is processing of determining display priority order of review information with respect to each of facilities, based on the search condition used in step S2 for the facility search. Herein, the display priority order is priority order when review information or the like is displayed. Also, when the contribution information acquired in the step S6 is one (that is, the number of the contribution of the review information is one), the display priority order of the review information may be set to ranking No. 1 in the display priority order determining processing.

Hereinafter, determining methods (i) to (ix) for determining the display priority order of the review information in the display priority order determining processing will be described in detail.

(i) Determining Method Based on Number of Appearances of Keyword

In the case of this method, the system controlling unit 4 counts the number (number of appearances) of a keyword input as a search condition and included (described) in the review information with respect to each piece of the review information. Also, a determination as to whether the keyword is included in the review information is performed by, for example, extracting morphemes by dividing a character string included in the review information by a morphological analysis, which is one of natural language processings, and comparing the corresponding morpheme with the keyword (the same is true of a related word, a synonym, and a modifier or the like to be described below). Subsequently, the system controlling unit 4 determines the display priority order based on the count number of the keyword (by comparing the count number among pieces of the review information). For example, when the keyword is "bath", review information having a larger count number of "bath" is determined to have higher display priority order. Therefore, the user is allowed to preferentially browse the review information in which the number of appearances of the keyword input by the user this time is large (that is, review information estimated to be desired by the user). Also, the display priority order may be configured to be determined based on the number of the keywords and the count number of at least one term of the related word and the synonym associated with the corresponding keyword. Herein, the related word associated with the keyword refers to a word related to the keyword. For example, when the keyword is "bath", the related word may be "bathtub", "hot spring", and "public bath" or the like. Also, the synonym associated with the keyword is a word (synonym) having substantially the same meaning as the keyword or a word (class word) similar to the keyword. The related word or the synonym may be extracted using, for example, a thesaurus or the like stored in the storing unit 2. The display priority order of the review information having the largest count number is ranking No. 1, and, for example, when the review list page is displayed on the window screen, the corresponding review information is displayed at the uppermost position of the window screen. Also, when there is a plurality of review information having the same count number of the keyword or the like, the display priority order of the review information may be configured to follow display priority order determined by, for example, registration time (ascending order of contribution date/descending order of contribution date) or any one of determining methods (ii) to (ix).

(ii) Determining Method Based on Evaluation Value of Evaluation Item Associated with Keyword In the case of this method, the system controlling unit 4 specifies the evaluation item, which is associated with the keyword input as the search condition, from the evaluation value of each evaluation item included in each piece of the acquired contribution information. For example, when the keyword (the related word or the synonym corresponding to the keyword) is "open-air bath", the evaluation item "bath" included therein is specified. Subsequently, the system controlling unit 4 determines display priority order based on each user's evaluation value with respect to the specified evaluation item. For example, as the evaluation value with respect to the specified evaluation item "bath" is higher, the corresponding review information is determined to have higher display priority order. Therefore, the user is allowed to preferentially browse the review information in which the evaluation item associated with the keyword input by the user this time is high. Also, when there is a plurality of review information having the same evaluation value, the display priority order thereof may be configured to follow display priority order determined by, for example, registration time (ascending order of contribution date/descending order of contribution date) or any one of determining methods (i) and (iii) to (ix).

(iii) Determining Method Based on Inclusion Rate of Keyword

In the case of this method, the system controlling unit 4 determines display priority order such that higher display priority is given to review information including a plurality of different keywords input as the search condition. For example, it is assumed that there are two input keywords, "bath" and "open-air", and three pieces of review information have been acquired. In this case, the display priority order of the review information including all of the keywords (that is, 100% inclusion rate: which may be the related word or the synonym associated with the corresponding keyword) is ranking No. 1 (highest priority), the display priority order of the review information including one of the keywords (that is, 50% inclusion rate: which may be the related word or the synonym associated with the corresponding keyword) is ranking No. 2, and the display priority order of the review information including no keywords (that is, 0% inclusion rate: which may be the related word or the synonym associated with the corresponding keyword) is ranking No. 3. Therefore, the user is allowed to preferentially browse the review information in which the inclusion rate of the plurality of keywords input by the user this time is high. Also, when there is a plurality of review information having the same keyword inclusion rate, the display priority order thereof may be configured to follow display priority order determined by, for example, registration time (ascending order of contribution date/descending order of contribution date) or any one of determining methods (i), (ii) and (iv) to (ix).

(iv) Determining Method Based on Keyword Input Order

In the case of this method, the system controlling unit 4 determines display priority order based on input order of a plurality of different keywords input as the search condition. Herein, a method for determining input order of keywords may include the following methods (iv-1) to (iv-4).

The method (iv-1) is configured such that a plurality of keywords input to the keyword input unit 51 is described within a search query while maintaining the input anteroposterior relationship. The system controlling unit 4 determines the keyword input order from the anteroposterior relationship of keywords described within the received search query (that is, description order) (for example, as the description order is earlier, the keyword input order is first).

The method (iv-2) is configured such that whenever a keyword is input to the keyword input unit 51, the corresponding keyword is transmitted to the information providing server SA. This configuration is configured by a script embedded in a search condition input page (for example, simple program described by a script language such as JavaScript (registered trademark) or the like). The system controlling unit 4 determines the input order based on input order of keywords (as the reception is earlier, the keyword input order is first).

The method (iv-3) is configured such that a selection button corresponding to the keyword is provided on the search condition input page and, whenever the selection button is selected by the user, the corresponding keyword is transmitted to the information providing server SA. This configuration is also configured by, for example, a script embedded in the search condition input page. The system controlling unit 4 determines the input order based on reception order of keywords.

The method (iv-4) is configured such that a selection button corresponding to the keyword is provided on the search condition input page and, whenever the selection button is selected by the user, the selection time is accumulated by the web browser. Also, it is configured such that, when a search button 53 is designated after the selection of the corresponding selection button, each keyword associated with the corresponding selection button and each selection time are described within the search query and are transmitted to the information providing server SA. This configuration is also configured by, for example, a script embedded in the search condition input page. The system controlling unit 4 determines the keyword input order from the selection time described within the received search query (as the selection time is earlier, the keyword input order is first).

For example, when there are two input keywords, "bath" and "meal", and the input order has been determined in order of "bath"→"meal" by the determining method, as illustrated in FIG. 5A, review information including "bath" (which may include related word or synonym corresponding thereto) is determined to be higher in display order than review information including "meal" (which may also include related word or synonym corresponding thereto). That is, the review information including "bath" is determined to have higher display priority order. Therefore, the user is allowed to preferentially browse the review information including a keyword, whose input order is earlier, among a plurality of keywords input by the user this time. Also, when there is a plurality of review information having the same input order, the display priority order thereof may be configured to follow display priority order determined by, for example, registration time (ascending order of contribution date/descending order of contribution date) or any one of determining methods (i) to (iii) and (v) to (ix).

(v) Determining Method Based on Keyword Associated with Appeal Component of Facility Provider Side In the case of this method, the system controlling unit 4 determines display priority order such that higher display priority is given to review information including a keyword (related word or synonym corresponding to the keyword) associated with an appeal component of a facility provider side among a plurality of keywords input as the search condition. For example, when there are two input keywords, "bath" and "meal", and the appeal component (selling) of the provider side is "meal", review information including "meal" is determined to be higher in display order than review information including "bath", without regard to the keyword input order. Therefore, the user is allowed to preferentially browse the review information including a keyword associated with the appeal component of the facility provider side among a plurality of keywords input by the user this time, that is, review information the provider side wants to allow the user to browse. Herein, the appeal component of the provider side is previously set by a request through the facility terminal STm of the provider side. Also, when there is a plurality of review information including the keyword, the display priority order thereof may be configured to follow display priority order determined by, for example, registration time (ascending order of contribution date/descending order of contribution date) or any one of determining methods (i) to (iii) and (v) to (ix).

(vi) Determining Method Based on Number of Facility Users

In the case of this method, the system controlling unit 4, for example, refers to the plan information database 23 and specifies transaction information including the number attribute, to which the number of users input as the search condition belongs, among pieces of transaction information associated with each piece of contribution information (review information) (transaction information in which "use" is set in the use/non-use item). For example, when the number of users input as the search condition is "one person", transaction information in which the number attribute includes "1-person use" is specified. Also, for example, when the number of users input as the search condition is "two persons", transaction information in which the number attribute includes "2-person use" is specified. Also, for example, when the number of users input as the search condition is "three persons", "four persons", or "five persons", the transaction information in which the number attribute includes "N-person use" is specified. The system controlling unit 4 determines the display priority order such that higher display priority is given to the review information associated with the corresponding specified transaction information (including the number attribute matched with the number attribute of the number of users input as the search condition). Therefore, the user is allowed to preferentially browse the review information matched with the number of users input by the user this time. Also, in the above, in a case where there is a plurality of review information associated with the same number attribute (that is, in a case where a plurality of transaction information is specified, and the number attribute included in each piece of the transaction information is equal), and in a case where the number of users associated with each of the plurality of review information is different, the system controlling unit 4 determines the display priority order such that higher display priority is given to the review information associated with the number of users, which has a small difference from the number of users input as the search condition. Herein, when the difference is smallest (that is, "0"), the number of users input as the search condition is matched with the number of users associated with the review information. For example, in a case where the number of users input as the search condition is "five persons", the number of users associated with review information R1 is "five persons", and the number of users associated with review information R2 is "three persons", higher display priority is given to the review information associated with the number of users having a small difference, that is, five persons. Also, when there is a plurality of review information associated with the same number attribute, the display priority order thereof may be configured to follow display priority order determined by, for example, registration time (ascending order of contribution date/descending order of contribution date) or any one of determining methods (i) to (v) and (vii) to (ix).

(viii) Determining Method Based on Positive Review by Contributor

In the case of this method, with respect to the keyword (the related word or the synonym corresponding to the keyword) input as the search condition, the system controlling unit 4 determines display priority order such that higher priority is given to review information including a preset positive term (for example, a term registered in a dictionary where a plurality of kinds of positive words is registered). For example, in a case where the keyword input as the search condition is "bath", it is assumed that "bath" and a "positive term" corresponding thereto are included in the review information A, and "bath" is included in the review information B (a positive term corresponding to "bath" is not included). In this case, the review information A is determined to have higher display priority than the review information B (display priority: A>B). Alternatively, in a case where the keyword input as the search condition is "bath" and "meal", it is assumed that "bath" and a "positive term" corresponding thereto, and "meal" and a "positive term" corresponding thereto are included in the review information, and "bath", a "positive term" corresponding thereto, and "meal" are included in the review information B (a positive term corresponding to "meal" is not included), and "bath" and "meal" are included in the review information C (positive terms corresponding to "bath" and "meal" are not included). In this case, the review information A is determined to have higher display priority than the review information B, and the review information B is determined to have higher display priority than the review information C (display priority: A>B>C).

Also, examples of the "preset positive term with respect to the keyword" may include a positive term having a modification relation with the term associated with the keyword input as the search condition, or a positive term associated with the item corresponding to the input keyword. Examples of the modification relation may include a subject-predicate relation, a modifier-modificand relation, and the like. For example, it corresponds to a case where a term (for example, bath) associated with the keyword (for example, bath) input as the search condition (the term being matched with the keyword or including this) is a subject, and a predicate includes a positive term (for example, "was wide", "was good", or the like). Alternatively, it corresponds to a case where the term associated with the keyword input as the search condition is a non-modifier, and the modificand is a positive term (for example, "wide", "clean", "good spring quality", or the like). Also, the above item may be the above-described evaluation item, or may be configured to be arbitrarily set by a facility side. For example, in the configuration in which the user can designate the item when inputting the review information or the configuration in which the user can input the review information to a review input field divided item by item, it corresponds to a case where a term associated with item (for example, "bath") corresponding to a keyword (for example, "an open-air bath") input as the search condition (the term being matched with the keyword or including this) is a positive term (for example, "wide", "good", "clean", "good spring quality", or the like). Therefore, the user is allowed to preferentially browse the review information including the positive term with respect to the keyword input by the user this time. Also, when there is a plurality of review information having the positive term with respect to the keyword, the display priority order thereof may be configured to follow display priority order determined by, for example, registration time (ascending order of contribution date/descending order of contribution date) or any one of determining methods (i) to (vi), (viii) and (ix).

Also, in the case of the determining method (vii), it may be configured such that, with respect to the keyword (may be the related word or the synonym corresponding to the keyword) input as the search condition, review information including a preset negative term is distinguished from the review information including the positive term. In this case, the display priority order of the review information including the negative term may be configured to follow display priority order determined by registration time (ascending order of contribution date/descending order of contribution date) or any one of determining methods (i) to (vi), (viii) and (ix).

(viii) Determining Method Based on Positive Comment by Facility Side

In the case of this method, with respect to the keyword (the related word or the synonym corresponding to the keyword) input as the search condition, the system controlling unit 4 determines display priority order such that higher priority is given to review information including associated with the comment information including the preset positive term. For example, in a case where the keyword input as the search condition is "bath", "bath" and a "positive term" corresponding thereto are included in comment information α, and "bath" is included in comment information β (a positive term corresponding to "bath" is not included). In this case, the review information A associated with the comment information α is determined to have higher display priority than the comment information B associated with the comment information β. Alternatively, in a case where the keyword input as the search condition is "bath" and "meal", it is assumed that "bath" and a "positive term" corresponding thereto, and "meal" and a "positive term" corresponding thereto are included in the comment information α; "bath", a "positive term" corresponding thereto, and "meal" are included in the comment information β (a positive term corresponding to "meal" is not included); and "bath" and "meal" are included in the comment information γ (positive terms corresponding to "bath" and "meal" are not included). In this case, the review information A associated with the comment information α is determined to have higher display priority than the comment information B associated with the comment information β, and the review information B associated with the comment information β is determined to have higher display priority than the comment information C associated with the comment information γ.

Also, as in the case of the above (vii), examples of the "preset positive term with respect to the keyword" may include a positive term having a modification relation with the term associated with the keyword input as the search condition, or a positive term associated with the item corresponding to the input keyword. In the latter case, for example, in the configuration in which the facility provider side can designate the item when inputting the comment information or the configuration in which the facility provider side can input the comment information to a comment input field divided item by item, higher priority is given to review information associated with the comment information including a positive term (for example, improvement or the like) in association with an item (for example, meal) (the item being matched with the keyword or including this) corresponding to the keyword (for example, food) input as the search condition. Therefore, the user is allowed to preferentially browse the review information containing the comment information including the positive term associated with the keyword input by the user this time. Also, when there is a plurality of review information associated with the comment information including the positive term with respect to the keyword, the display priority order thereof may be configured to follow display priority order determined by, for example, registration time (ascending order of contribution date/descending order of contribution date) or any one of determining methods (i) to (vii) and (ix).

(ix) Determining Method Based on Period Associated with Search Condition

In the case of this method, the system controlling unit 4 determines display priority order such that higher display priority is given to review information associated with the same usage period as the period associated with the search condition. Herein, the period associated with the search condition is calculated based on a usage schedule input as the search condition. For example, in a case where the usage schedule as the search condition is input as the 11th to 18th of July by the user, the period associated with the search condition is "summer". In this case, the review information associated with the transaction information including "summer" as the usage period is determined to have higher display priority than the review information associated with the transaction information including seasons other than "summer". Therefore, the user is allowed to preferentially browse the review information matched with the period including the usage schedule input by the user this time. Also, when there is a plurality of review information associated with the same usage period as the period associated with the search condition, the display priority order thereof may be configured to follow display priority order determined by, for example, registration time (ascending order of contribution date/descending order of contribution date) or any one of determining methods (i) to (viii).

The display priority order determined as above is assigned to each piece of the review information with respect to each facility, and contribution information including each piece of the review information, to which the display priority order is assigned, is temporarily stored in a RAM 4c in association with facility IDs. Also, in the case of determining the display priority order of the review information based on a combination of two or more of the determining methods (i) to (ix), the system controlling unit 4 may be configured to calculate a total score of scores obtained by multiplying the reciprocal of the display priority order, which is determined by each of the determining methods, by a predetermined coefficient (1 or more) with respect to each piece of the review information (the scores may be obtained by multiplying the display priority order by a predetermined coefficient (1 or less)), and determine the display priority order based on the total score. Therefore, by using the search condition of the facility or the like, it is possible to increase the accuracy of the review information estimated to be desired by the user. In this case, for example, as the review information has a higher score, the review information is determined to have higher display priority. Also, it may be configured such that the coefficient is set to a value depending on a weighted value (for example, arbitrarily set by the user) of each of the determining methods (for example, as the determining method is more desired to be preferred, a value larger than the coefficient (1 or more) (or a value smaller than the coefficient (1 or less)).

Subsequently, in step S8, the system controlling unit 4 determines whether all of the facility IDs acquired in the step S1 are specified. Subsequently, when it is determined that all of the facility IDs acquired in the step S1 are not specified (NO in the step S8), the system controlling unit 4 returns to the step S4 to specify the unspecified facility IDs and perform the above-described processing (the display priority order determining processing and the like). Therefore, the display priority order of the review information regarding the facilities is determined with respect to each of the facilities associated with the facility IDs acquired in the step S1. On the other hand, when it is determined that all of the facility IDs acquired in the step S1 are specified (YES in the step S8) the system controlling unit 4 waits until a request from the user terminal UT1, for example, is timed out. Also, due to the time-out, for example, information indicating the display priority order determined in the step S7 and temporarily stored in the RAM 4c (display priority order of the review information regarding each of the facilities) is deleted.

Subsequently, for example, in a state in which the facility list page as illustrated in FIG. 5B is displayed on the window screen of the user terminal UT1, if the user performs a review list request operation (for example, designates a character string 62, that is, "customer voice"), the page request representing the request for the review list page (including the facility ID of the facility corresponding to the character string 62) is transmitted from the user terminal UT1 through the network NW to the information providing server SA. Subsequently, when receiving the page request representing the request for the review list page from the user terminal UT1, the system controlling unit 4 starts processing illustrated in FIG. 4B. When the processing illustrated in FIG. 4B is started, the system controlling unit 4 of the information providing server SA generates the review list page for displaying the review information regarding the facility in the display priority order assigned to each piece of the review information associated with the facility ID represented by the page request (in the display priority order determined based on the search condition) (step S11), and transmits a structured document file or the like of the corresponding review list page to the user terminal UT1 (step S12). Therefore, all or part of the review information is displayed on the window screen in the determined display priority order by the web browser of the user terminal UT1.

FIG. 6A is a diagram illustrating a display example of the review list page. On the review list page illustrated in FIG. 6A, the review information is displayed with information of a contributor's nickname and contribution date and time in the display priority order determined based on the search condition used for the facility search. On the review list page displayed as above, review information that cannot be displayed within the window screen is displayed on the window screen by scrolling display content of the review list page according to a user's scroll operation.

As described above, according to the embodiment, it is configured such that the display priority order of the review information regarding the facilities is determined based on the search condition used for the facility search, and at least one piece of the review information regarding each of the facilities is displayed based on the corresponding display priority order. Therefore, even when a plurality of review information regarding the facilities is registered, it is possible to reduce time and effort necessary for the user to find desired review information, and the user is allowed to preferentially browse review information estimated to be desired by the user.

Also, in the step S7 of FIG. 4A, with respect to the keyword input as the search condition, the determining method (vii) may also be configured to display a list of the review information including the preset positive term and a list of the review information including the preset negative term at different positions. The review list page displaying the list of the review information including the positive term and the list of the review information including the negative term separately, for example, vertically or horizontally, may be configured to be displayed on the window screen of the user terminal UT1. Therefore, since the user can browse the review information while comparing the review information including the positive term with the list of the review information including the negative term with respect to the input keyword, it is possible to reduce time and effort necessary for the user to find desired review information.

Also, for example, in the character string related to the review information displayed as illustrated in FIG. 6A, the keyword input as the search condition may be configured to be highlighted (for example, a character color of the keyword is displayed in a conspicuous color different from the other characters, or a character size of the keyword is displayed in a larger size than the other characters). Therefore, since the user can browse the review information while looking at the highlighted input keyword, it is possible to further reduce time and effort necessary for the user to find desired review information. Also, in the character string related to the review information displayed as illustrated in FIG. 6A, the related word or the synonym associated with the keyword input as the search condition, or the positive modifier modifying the keyword (related word or synonym associated with the corresponding keyword) may be configured to be highlighted.

Also, in the processing illustrated in FIG. 4A, the user's waiting time until the facility list page is displayed is shortened by configuring the system controlling unit 4 of the information providing server SA to transmit the structured document file or the like of the facility list page (step S3), performing the display priority order determining processing (step S7), and then transmitting the structured document file or the like of the review list page to the user terminal UT1 (step S12). As another example of this configuration, the system controlling unit 4 of the information providing server SA may be configured to perform the processing of the steps S4 to S8 before transmitting the structured document file or the like of the facility list page to the user terminal UT1 (step S3). In the case of this configuration, the system controlling unit 4 of the information providing server SA transmits the structured document file or the like of the facility list page, which displays a predetermined number (at least one) of review information (for example, review information whose display priority order is ranking No. 1), to the user terminal UT1, based on the display priority order determined in the step S7.

FIG. 6B is a diagram illustrating a display example of the facility list page on which the review information is displayed. On the facility list page illustrated in FIG. 6B, for example, the review information 65 whose display priority order is ranking No. 1 is displayed, and a button for displaying the next ranked review information (herein, a character string "further display the review information") 66 is displayed in the display area 61 of the facility information of the facility XXX. In a state in which the facility list page as illustrated in FIG. 6B is displayed on the window screen of the user terminal UT1, if the user performs a review list request operation (for example, designates the character string 66, that is, "further display the review information"), the page request representing the request for the review list (including the facility ID of the facility corresponding to the character string 66) is transmitted from the user terminal UT1 through the network NW to the information providing server SA. Subsequently, when receiving the page request representing the request for the review list from the user terminal UT1, the system controlling unit 4 of the information providing server SA transmits display data for displaying the next ranked review information to the user terminal UT1. Therefore, for example, the review information after the ranking No. 2 is displayed under the display area of the review information 65 whose display priority order is ranking No. 1. In this case, for example, by using Ajax, the display data is transmitted to the user terminal UT1, without refreshing the entire facility list page (without reloading from the information providing server SA by the user terminal UT1), so that the list of the review information whose display priority order is ranking No. 2 or lower is displayed within the facility list page. Also, as another example of this case, when receiving the page request representing the request for the review list from the user terminal UT1, the system controlling unit 4 of the information providing server SA may be configured to perform the processing of the steps S11 and S12 illustrated in FIG. 4B.

Also, in the present embodiment, the information providing server SA is configured to perform the display priority order determining processing (that is, the information providing server SA functions as the information processing apparatus of the present invention), but, as another example, the user terminal UT1 may be configured to perform the display priority order determining processing (that is, the user terminal UT1 may function as the information processing apparatus of the present invention). In the case of this configuration, an information processing program of the present invention is installed on the user terminal UTn. The user terminal UTn (CPU as a searching means) transmits the above-described search condition to the information providing server SA and causes the information providing server SA to search the facilities. The user terminal UTn acquires information of the facilities searched by the information providing server SA. This information includes review information regarding each of the searched facilities. The user terminal UTn determines the display priority order of the review information regarding the facilities with respect to each of the searched facilities, based on the search condition. The user terminal UTn displays at least one piece of the review information regarding the searched facilities on the window screen, based on the determined display priority order. Also, in the case of this configuration, the information processing program installed on the user terminal UTn, for example, may be downloaded from a predetermined server or the like through the network NW, or may be readable from a recording medium having stored therein the program, such as a CD, a DVD, or the like. Also, as another example, the information processing program of the present invention, for example, may be configured to be described by a script (simple program described by a script language, for example, JavaScript (registered trademark) or the like) within a structured document constituting the search condition input page, and the corresponding script may be executed by the web browser (even in the case of this configuration, the user terminal UTn functions as the information processing apparatus of the present invention).

Also, in the above embodiment, the facility has been described as an example of the transaction target, but the embodiment can also be applied to other examples of the transaction target, such as a product, a store (for example, restaurant), or a dealer (catalog retailer or a real estate agent). Also, in a case where the transaction target is a product, a product information database is used instead of the facility information database 22. Information regarding products capable of commercial transaction (sale and purchase) on a shopping site or an auction site is registered in the product information database. Specifically, product IDs of products provided (submitted) by a product exhibitor (store or individual), product information (product name, description of product, product image, product price, and the like), transaction information (exhibition date and time, deal-making date and time, and the like), contribution information, comment information, and the like are registered (stored) in the product information database in association with the products. The information providing server SA acquires the review information regarding the searched products by using the product information database, and determines the display priority order of the review information regarding the products, based on the search condition.

REFERENCE SIGN LIST 1 communication unit
2 storing unit
3 input/output interface unit
4 system controlling unit
5 system bus
UTn user terminal
STm facility terminal
SA information providing server
NW network

The invention claimed is:
1. An information providing apparatus comprising:
a non-transitory memory operable to store program code; and
a processor operable to read the program code, and operate as instructed by the program code, the program code comprising:
  search query receiving code configured to cause the processor to acquire a search query including one or more search criteria that are specified by a user to search for a desired transaction target;
  search code configured to cause the processor to identify transaction targets that match the one or more search criteria included in the search query, from a first storage configured to store information about a plurality of transaction targets, and provide a transaction target list page that lists the identified transaction targets;
  acquisition code configured to cause the processor to acquire reviews on one of the identified transaction targets, from a second storage configured to store a plurality of reviews on each of the plurality of transaction targets;
  determination code configured to cause the processor to determine display priority orders of the acquired reviews on the one of the identified transaction targets, based on how relevant to at least one of the one or more search criteria, specified by the user to search for the desired transaction target, each of the acquired reviews is; and
  control code configured to cause the processor to automatically arrange, in the determined display priority orders, the acquired reviews that are listed in association with the one of the identified transaction targets listed in the transaction target list page,
wherein the determination code is further configured to cause the processor to determine the display priority order such that a review more relevant to the at least one of the one or more search criteria specified by the user has a higher display priority order on a list of the acquired reviews,
at least one first review having a higher display priority order, among the acquired reviews, is displayed on a display screen, and second reviews having lower display priority orders than the at least one first review, among the acquired reviews, are not displayed on the display screen until a predetermined operation for displaying the second reviews is performed, and the second reviews are displayed on a new display screen, which changes from a previous display screen, in response to the predetermined operation being performed.

2. The information providing apparatus according to claim 1, wherein the determination code is further configured to cause the processor to determine a display priority order of a review, based on a number of the one or more search criteria included in the review, and a number of related words and synonyms of the one or more search criteria that are included in the review.

3. The information providing apparatus according to claim 1, wherein evaluation scores of evaluation items with respect to the one of the identified transaction targets are associated with each of the acquired reviews, and
   the determination code is further configured to cause the processor to determine the display priority orders, based on the evaluation scores.

4. The information providing apparatus according to claim 1, wherein the determination code is further configured to cause the processor to determine a display priority order such that a higher display priority is given to a review that comprises the one or more search criteria.

5. The information providing apparatus according to claim 1, wherein, among number attributes corresponding to numbers of users that used the transaction targets, a number attribute corresponding to a number of users that used the one of the identified transaction targets is associated with at least one review, and
   the determination code is further configured to cause the processor to determine a display priority order such that a higher display priority is given to a review that is associated with the number attribute that is included in the one or more search criteria.

6. The information providing apparatus according to claim 5, wherein the determination code is further configured to cause the processor to, when there are a plurality of reviews that are associated with the same number attribute, determine the display priority order such that a higher display priority is given to a review that is associated with a number of users that has a smallest difference from the number of users that is included in the one or more search criteria.

7. The information providing apparatus according to claim 5, wherein the determination code is further configured to cause the processor to determine the display priority order such that a higher display priority is given to a review comprising a preset positive term corresponding to one of the one or more search criteria.

8. The information providing apparatus according to claim 5, wherein a past usage period of the one of the identified transaction targets is associated with at least one review, and
   the determination code is further configured to cause the processor to determine the display priority order such that a higher display priority is given to a review that is associated with the same usage period as a period that is included in the one or more search criteria.

9. The information providing apparatus according to claim 1, wherein comment information of a provider side of the one of the identified transaction targets is stored in a third storage in association with each of the acquired reviews, and
   the determination code is further configured to cause the processor to determine a display priority order such that a higher display priority is given to a review that is associated with the comment information comprising a preset positive term corresponding to one of the one or more search criteria.

10. The information providing apparatus according to claim 1, wherein the determination code is further configured to cause the processor to determine a display priority order such that a higher display priority is given to a review comprising a preset positive term corresponding to one of the one or more search criteria.

11. The information providing apparatus according to claim 1, wherein a past usage period of the one of the identified transaction targets is associated with at least one review, and
    the determination code is further configured to cause the processor to determine a display priority order such that a higher display priority is given to a review that is associated with the same usage period as a period that is included in the one or more search criteria.

12. The information providing apparatus according to claim 1, wherein the determination code is further configured to cause the processor to determine a first display priority of a first review that comprises a preset positive term corresponding to one of the one or more search criteria, and a second display priority of a second review that comprises a preset negative term corresponding to another one of the one or more search criteria, and
    the control code is further configured to cause the processor to control to display the first review and the second review at different positions, based on the determined first display priority and the determined second display priority.

13. The information providing apparatus according to claim 1, wherein the control code is further configured to cause the processor to control to highlight a search criterion, which is one of the one or more search criteria, that is included in the listed reviews.

14. The information providing apparatus according to claim 1, wherein the determination code is further configured to cause the processor to determine a display priority order, based on an input order of the one or more search criteria.

15. The information providing apparatus according to claim 14, wherein the determination code is further configured to cause the processor to determine the input order of the one or more search criteria, such that for a search criterion whose description order is earlier, the input order of the search criterion is earlier.

16. The information providing apparatus according to claim 14, wherein the search query receiving code is configured to cause the processor to transmit each of the one or more search criteria to an information providing server, and
    wherein the determination code is further configured to cause the processor to determine the display priority order, based on the input order of the one or more search criteria to the information providing server.

17. The information providing apparatus according to claim 14, wherein the search query receiving is code configured to cause the processor to transmit each of the one or more search criteria to an information providing server, based on a selection of a selection button corresponding to a respective one of the one or more search criteria by the user.

18. The information providing apparatus according to claim 17, wherein the search query receiving code is configured to cause the processor to accumulate and transmit a selection time of the selection button to the information providing server, and wherein the determination code is further configured to cause the processor to determine the input order of the one or more search criteria, based on the selection time of the selection button corresponding to respective one of the one or more search criteria.

19. The information providing apparatus according to claim 18, wherein the search query receiving code configured to cause the processor to describe each selection time within the one or more search criteria.

20. The information providing apparatus according to claim 1, wherein the transaction target list page contains, in association with the one of the identified transaction targets, a link to a review list page that lists the acquired reviews in the determined display priority order, and
the review list page is provided in response to a user operation on the link on the transaction target list page.

21. The information providing apparatus according to claim 1, wherein the transaction target list page further lists, in association with the one of the identified transaction targets, the acquired reviews in the determined display priority order.

22. The information providing apparatus according to claim 1, wherein the determination code is further configured to cause the processor to determine a display priority order such that a higher display priority is given to a first review of the acquired reviews that comprises, among the one or more search criteria, a first search criterion having a first input order earlier than a second input order of a second search criterion and is without the second search criterion and a lower display priority is given to a second piece of the acquired reviews that is without the first search criterion and comprises the second search criterion.

23. The information providing apparatus according to claim 1, wherein the determination code is further configured to cause the processor to determine display priority orders of the acquired reviews on the one of the identified transaction targets according to two or more different methods for calculating of relevancy of each review to the at least one of the one or more search criteria, obtain weighted values of the display priority orders by using weights corresponding to the two or more different methods, and
the control code is further configured to cause the processor to automatically arrange, according to the weighted values of the display priority orders, the acquired reviews that are listed in association with the one of the identified transaction targets listed in the transaction target list page.

24. The information providing apparatus according to claim 1, wherein the predetermined operation is a scroll operation to scroll the display screen.

25. The information providing apparatus according to claim 1, wherein the control code is further configured to cause the processor to automatically arrange a review having the highest display order at a position closest to a top of the display screen based on the determined display priority orders.

26. The information providing apparatus according to claim 1, wherein the search query receiving code is further configured to cause the processor to acquire the search query from a user input on a search condition input page, the search condition input page comprising one or more selection buttons corresponding to the one or more search criteria, and
wherein when two or more selection buttons are selected by the user on the search condition input page to specify the one or more search criteria,
the search query receiving code is further configured to cause the processor to accumulate and transmit selection times of the two or more selection buttons,
the determination code is further configured to cause the processor to determine the display priority orders such that a review matching a search criterion corresponding to a selection button, among the two or more selection buttons, that is selected earlier has a higher display priority than a review matching a search criterion corresponding to a selection button, among the two or more selection buttons, that is selected later.

27. An information providing method that is executed by a computer, the information providing method comprising:
acquiring a search query including one or more search criteria that are specified by a user to search for a desired transaction target;
identifying transaction targets that match the one or more search criteria included in the search query, from a first storage configured to store information about a plurality of transaction targets, and provide a transaction target list page that lists the identified transaction targets;
acquiring reviews on one of the identified transaction targets, from a second storage configured to store a plurality of reviews on each of the plurality of transaction targets;
determining display priority orders of the acquired reviews on the one of the identified transaction targets, based on how relevant to at least one of the one or more search criteria, specified by the user to search for the desired transaction target, each of the acquired reviews is; and
automatically arranging, in the determined display priority orders, the acquired reviews that are listed in association with the one of the identified transaction targets listed in the transaction target list page,
wherein the determination code is further configured to cause the processor to determine the display priority order such that a review more relevant to the at least one of the one or more search criteria specified by the user has a higher display priority order on a list of the acquired reviews,
at least one first review having a higher display priority order, among the acquired reviews, is displayed on a display screen, and second reviews having lower display priority orders than the at least one first review, among the acquired reviews, are not displayed on the display screen until a predetermined operation for displaying the second reviews is performed, and
the second reviews are displayed on a new display screen, which changes from a previous display screen, in response to the predetermined operation being performed.

* * * * *